June 17, 1924.

J. H. RICHARDSON

SHAFT BALANCING DEVICE

Filed Aug. 11, 1919

INVENTOR

John H. Richardson
By his Attorney
Nelson N. Howard

Patented June 17, 1924.

1,497,735

UNITED STATES PATENT OFFICE.

JOHN H. RICHARDSON, OF MELROSE HIGHLANDS, MASSACHUSETTS, ASSIGNOR TO UNITED SHOE MACHINERY CORPORATION, OF PATERSON, NEW JERSEY, A CORPORATION OF NEW JERSEY.

SHAFT-BALANCING DEVICE.

Application filed August 11, 1919. Serial No. 316,808.

*To all whom it may concern:*

Be it known that I, JOHN H. RICHARDSON, a citizen of the United States, residing at Melrose Highlands, in the county of Middlesex and State of Massachusetts, have invented certain Improvements in Shaft-Balancing Devices, of which the following description, in connection with the accompanying drawings, is a specification, like reference characters on the drawings indicating like parts in the several figures.

This invention relates to balancing devices for preventing the vibration of shafts, for example, the shafts of buffing machines.

If a tool such as a buffing wheel or roll is off balance it does not produce good work because the high speed of rotation results in producing vibrations of the shaft and the tool.

An object of the invention is to provide an improved device of general utility and adapted to be secured in any position where needed on a shaft, which device will be so constructed and arranged that a proper balance of the shaft may be readily obtained.

The invention is described for the purpose of illustration, but not by way of limitation, with particular reference to use in shoe buffing machines.

The illustrated construction and arrangement are such that by the adjustment of an element such as a weight the desired proper balance of a shaft may be obtained. As shown, there is provided a weight-carrying member having means for adjustably locating it on a shaft, one portion of said member having a weight which is adjustable relatively to the axis of rotation of the shaft and the shape of the member being such that the entire device is itself balanced when the weight is in a position intermediate between its extremes of adjustment.

These and other features of the invention including certain details of construction will be better understood from the following description and the drawing, and the invention will be then more particularly pointed out in the claims.

Fig. 1 of the drawing is a perspective view of my improved balancing device in its preferred embodiment, said device being shown as mounted upon a shaft;

Fig. 2 is an elevation, partly broken out or in section;

Fig. 3 represents a section on line 3—3 of Fig. 2.

A portion of a shaft of a machine such as a buffing machine is indicated at 10, the balancing device comprising a collar 11 having a set screw 12 by means of which the collar may be adjustably located at any point desired longitudinally of the shaft or rotatably thereon.

One portion of the collar is radially bored as at 13, the outer portion being internally threaded at 14 and being of less diameter so as to provide a shoulder 15.

The balancing plug or weight has a threaded portion 16 to engage the threaded portion 14 of the chamber in the collar, and is formed with a flange 17 adapted to engage the shoulder 15 for a purpose presently explained. The outer end of the plug or weight has a transverse groove 18 to be engaged by a suitable tool such as a screw driver.

Fitting a central internally threaded aperture in the plug or weight is a set screw 19.

The plug or weight and the cavity containing it are so relatively shaped or proportioned that the plug is limited as to its outward movement so that it is prevented from ever projecting beyond the periphery of the collar, this result being obtained by coaction of the flange 17 with the shoulder 15. In other words, the distance of outward adjustment of the weight is limited so that, although access to the plug for adjusting it is from the outside of the periphery of the device, the weight can never project beyond said periphery.

The binding screw 19, after proper radial adjustment of the weight is obtained, is set against the shaft 10 so as to lock the weight in its radially adjusted position.

It is, of course, desirable that the device as a whole shall be practically balanced, when the weight is in a position intermediate its extremes of adjustment. In the particular embodiment of the invention illustrated, the removal of metal from the collar to provide the chamber 13 in which the weight is radially adjustable would throw the device out of balance unless some provision is made to counteract such effect. For this reason, in the device as illustrated, the collar is provided with a cavity or chamber 20 which is diametrically opposite the chamber 13, the weight of the amount of metal removed at 20 being substantially equal to the difference between the weight of the metal removed at 13 and the weight of the plug and its binding screw 19.

By means of this device the necessary balancing effect on the shaft is obtained by means of a single adjustable weight instead of, as has been proposed, the provision of a plurality of weights in different positions around the shaft.

Having described my invention, what I claim as new and desire to secure by Letters Patent of the United States is:—

1. A shaft-balancing device comprising a collar having means for adjustably locating it on a shaft, said collar having a cavity containing a radially adjustable weight and a cavity diametrically opposite the weight arranged to balance the first-mentioned cavity and the weight.

2. A shaft-balancing device comprising a ring-shaped member having diametrically opposite chambers, one of said chambers having a radially adjustable weight.

3. A shaft-balancing device comprising a collar having means for adjustably locating it on a shaft, said collar having a cavity containing a radially adjustable weight and a balancing cavity diametrically opposite the weight, means being provided to lock the weight in radially adjusted position.

4. A shaft-balancing device comprising a ring-shaped member having diametrically opposite chambers, one of said chambers having an internally threaded portion and a shoulder, a weight having screw-threaded engagement with the threaded portion of the chamber and having a flange to contact with said shoulder to limit outward movement, and a binding screw extending through said weight.

5. A shaft-balancing device comprising a weight-carrying member having a threaded radial depression, and a radially-adjustable weight in the depression, said member and said weight being so constructed and arranged as to be balanced when the weight is at an intermediate or zero position and variable therefrom in either a positive or negative sense, to balance eccentricities in the mass of a rotary member on which said device is mounted.

6. A device of the class described comprising, in combination, a shaft-embracing carrier having a threaded radial socket, and a threaded weight radially adjustable in the socket.

7. A device of the class described comprising, in combination, a shaft-embracing carrier having a threaded radial socket, and a threaded weight radially adjustable in the socket, said carrier and weight being so constructed and arranged as to be balanced in themselves when the weight is in one position of adjustment.

In testimony whereof I have signed my name to this specification.

JOHN H. RICHARDSON.